Aug. 26, 1941.  C. H. ZIMMERMAN  2,253,746
SAFETY TUBE
Filed Aug. 3, 1940  2 Sheets-Sheet 1
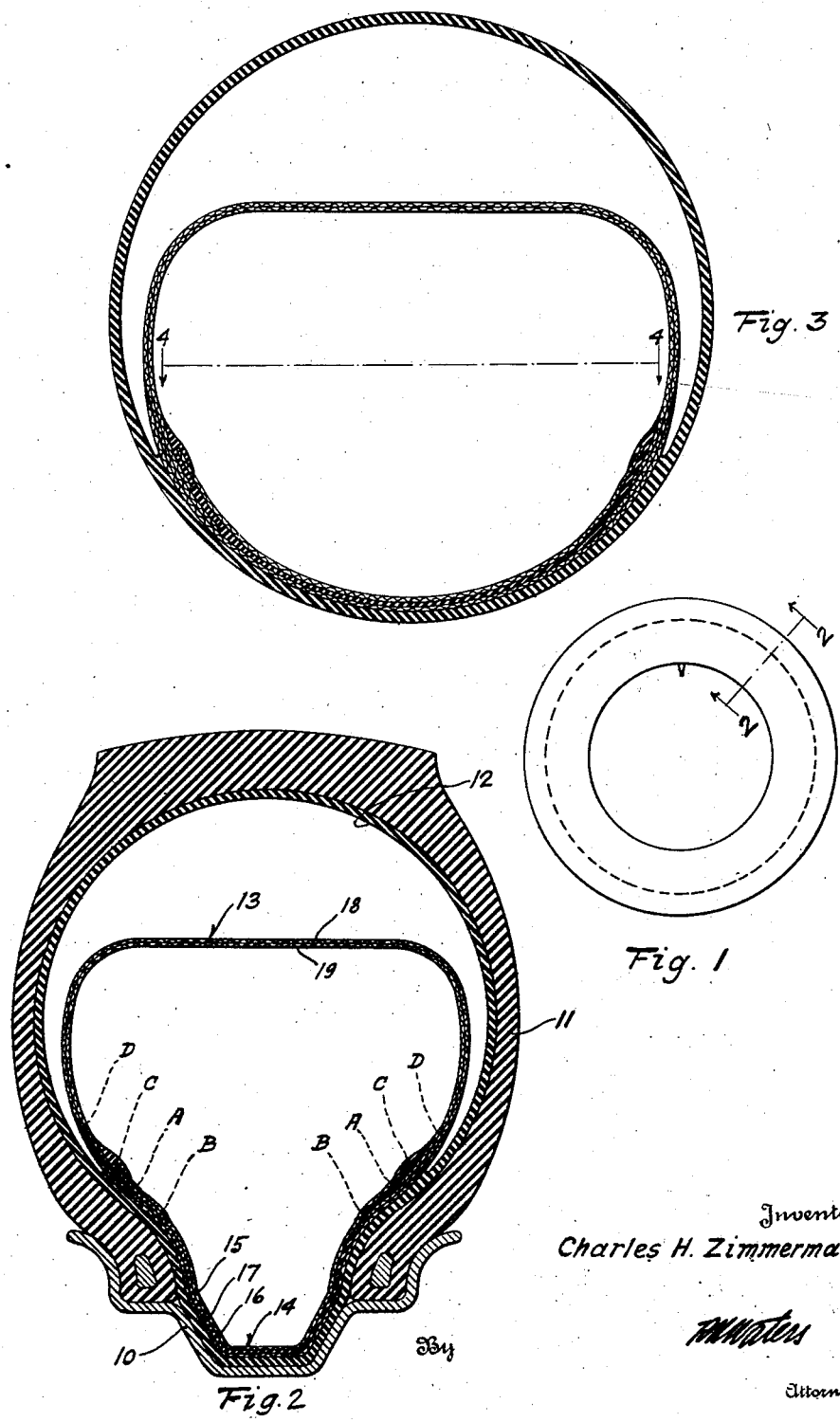
Inventor,
Charles H. Zimmerman
Attorney Patented Aug. 26, 1941

2,253,746

UNITED STATES PATENT OFFICE 2,253,746

SAFETY TUBE

Charles H. Zimmerman, Akron, Ohio, assignor to Wingfoot Corporation, Wilmington, Del., a corporation of Delaware Application August 3, 1940, Serial No. 350,441

11 Claims. (Cl. 152—339)

The present invention relates to safety tubes and particularly to the type of tube illustrated in the Lee Patent No. 2,173,065, granted September 12, 1939.

A particular object of this invention is to provide a safety tube of the plural-chamber type which will resist the action of centrifugal force to a greater extent and strengthen the tube against possible failure.

Another object of this invention is to provide a safety tube having a plurality of chambers, one within the other, with a common base wall which is made of fabric for additional strength, but so constructed as to extend into the well of a drop-center rim or the like upon inflation of the tube.

Another object of this invention is to provide in a tube of this character a laterally stretchable base portion which provides for a lateral and radially inward extensibility of the base portion in order that the base portion may extend itself into the well of a drop-center rim and without materially drawing the remaining portion of the inner tube radially inward.

Other objects of this invention will appear hereinafter as the description hereof proceeds, the novel features, arrangements and combinations being clearly set forth in the specification and in the claims thereunto appended.

In the drawings:

Fig. 1 shows a side elevation of an inner tube made according to my invention;

Fig. 2 is a cross-section taken substantially along the line 2—2 of Fig. 1;

Fig. 3 is a cross-section similar to Fig. 2 showing the tube in its normal shape prior to insertion in a tire and subsequent inflation thereof.

Figure 4:
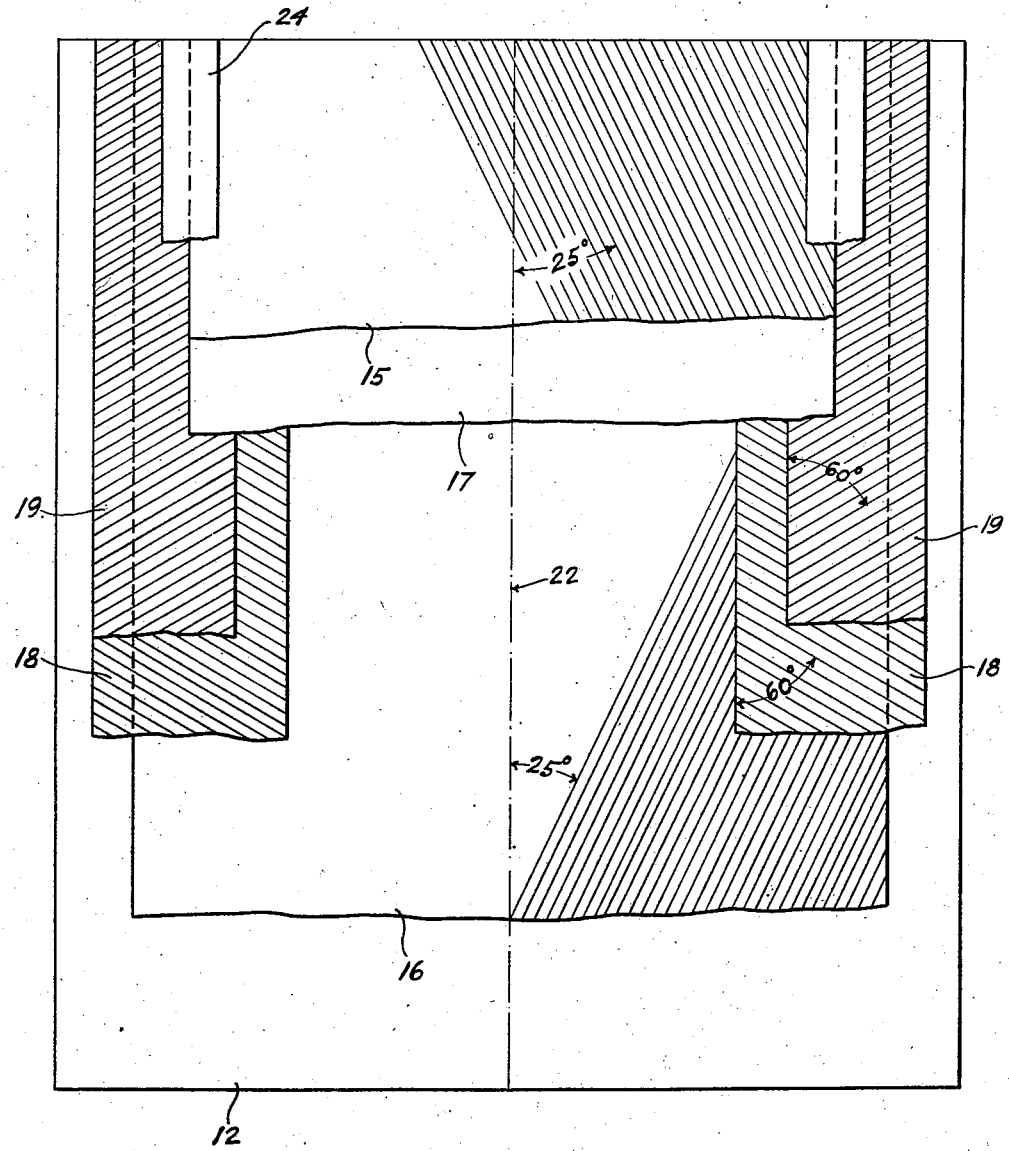
Fig. 4 illustrates the construction of the base portion of the tube.

In the drawings (Fig. 2) I have shown a drop-center rim 10 on which a tire 11 is mounted. The safety tube in this figure is shown inflated within the tire 11 and comprises the outer rubber wall 12 and the inner fabric wall 13, both of which are joined to the common base portion 14. The present invention is concerned primarily with the joining of the walls 12 and 13 with the wall 14 forming the base wall.

The wall 13 comprises a plurality of layers of cord fabric arranged with alternate layers having the cords thereof at a substantial angle with respect to each other, and extending in such a direction as to make this wall substantially inextensible in a longitudinal direction so as to resist the action of centrifugal force, as is more fully described in the aforesaid Lee patent.

In the drawings I have shown the wall 13 made of two plies, the inner one of which extends between the points A and the outer one of which extends between the points B. Normally, as in the aforesaid Lee patent, the outer flexible wall would be joined to the outer fabric layer extending between the points B and then across the base to form a stretchable base portion which would be received within the wall of a drop-center rim upon inflation of the tube. In this case, however, this rubber base portion is of a different construction and comprises the layers 15 and 16 having an intermediate layer of rubber 17 for cushioning purposes and for the purpose of permitting a change in the angular relation between the cords of the layers 15 and 16 upon inflation, as will be more fully described hereinafter. The layers 15 and 16 extend to the points C and D respectively, thus overlapping on opposite sides the wall 13 and the edges of the two plies forming this inner wall 13. The outer wall 12 extends completely around the inner tube and overlies the base portion thereof.

In Fig. 4 I have illustrated the construction of the base wall and illustrated the overlapping of this base wall with the plies of the inner wall 13. For the sake of clearness, the inner wall comprises the plies 18 and 19. Fig. 4 is a view looking from the interior of the tube in the direction 4—4 of Fig. 3, the base wall being assumed to have been flattened out for the sake of clarity in showing the various layers of fabric and rubber. Also in this figure it will be noted that the layers are stripped back partially to reveal other layers thereunder and it is to be understood that in this figure the various layers hereinafter referred to extend about the complete longitudinal dimension of that tube.

Overlying the edges 19 and 18 is the strip of rubber 17 and on this is placed a layer of cord fabric 15, in which the cord angle is approximately 25° from the center line 22. Beneath the layers of fabric 18 and 19 is another layer 16 of cord fabric in which the cords are also arranged at approximately 25° from the center line 22, but in which the cords extend in an opposite angle to said center line. Beneath the fabric layer 16 is the rubber forming the outer wall 12. In order to protect the edges of the fabric layer 15 and provide a good bond of the edges of this layer with the fabric layer 19, I provide the narrow rubber strips 24 of suitable gum stock and when the tube is vulcanized the rubber unites itself with the fabric layers and the fabric layers are bonded to each other and to the adjacent parts, making a unitary layer, the center portion of which on each side of the center line 22 comprises the two layers of fabric 15 and 16, the intermediate layer of rubber 17 and the rubber forming the outer wall 12.

As will be noted from an inspection of Fig. 4 the cord angles are at a relatively small angle with respect to the center line 22. Therefore, this central base portion may be stretched laterally to a considerable extent. As this lateral stretching takes place, the cord angles increase but in opposite senses, which is permitted by the intermediate cushion layer of rubber 17. This change in the cord angle is not so great as to offer any substantial resistance to lateral stretching and therefore the base portion can be extended over a sufficient area as to permit it to be forced downwardly into the well of the drop-center rim 10. In doing so, it does not have to change the radial position of the wall 13 and acts more like the flexible rubber base of the aforesaid Lee patent. However, this fabric of the base, since it overlaps the fabric of the wall 13 and is bonded thereto, has more resistance than a plain rubber wall would have and prevents the wall 13 from being moved outwardly under the action of centrifugal force more than an all-rubber base would. Additionally, since there is less drop in the modulus of elasticity between the layers of fabric and the fabric base than where an all-rubber base is provided, there is less tendency for the wall 13 to pull away from the base for it has been found that this tendency to pull away from the base of a tube of this character varies directly as the change in modulus between the wall 13 and the base.

Therefore, I have provided a base wall which assumes the characteristics of an all-rubber base wall in that it will extend itself into the base of a drop-center rim and in addition increases the strength of the inner tube by decreasing the difference in the modulus of elasticity between the wall 13 and the base 14.

Perhaps the ideal arrangement would be to have the inner tube shaped as shown in Fig. 2 and made entirely of fabric, having the cords so arranged as to make it entirely inextensible, as by continuing the walls 18 and 19 until they overlap each other, but a tube so made would have an internal diameter too small to enable one to assemble the tube on a drop-center rim and therefore the normal inner diameter of the tube must be large enough to enable the tube to be applied to and removed from the rim without too much difficulty. This can be done readily with the tube shown in the aforesaid patent to Lee, due to the fact that the inner wall is of rubber and will stretch freely and the purpose of this invention is to make the inner wall of fabric and yet retain to the necessary extent the characteristics of the all-rubber base.

It is entirely possible to use one layer of fabric in the base wall, such as the fabric 15 or the fabric 16, in which case the extensibility of the base is increased but, since the cords would run in but one direction, the forces in the base would not be equalized as were the cords of two layers run in opposite directions but at substantially the same angle. It may be even possible to increase the number of layers in the base portion but naturally this would make the base portion stiffer and the extensibility would be correspondingly decreased, unless perhaps the angles of the cords were changed to give greater lateral extensibility.

It will be noted that, due to the small angle of the cords, the cords run in the general direction of the center line 22 and therefore a lateral pull on the base tends to stretch the rubber between the cords to permit the lateral extensibility and the cushioning layer 17 prevents chafing of the cords of the layers 15 and 16, while permitting them to change their relative angles with respect to each other and to the center line of the base.

Obviously those skilled in the art to which this invention pertains may make various changes in the particular arrangement and construction of the parts without departing from the spirit of this invention and therefore I do not wish to be limited in my invention except as may be hereinafter set forth in the appended claims.

Having thus described my invention, what I claim and desire to secure by Letters Patent of the United States is:

1. An inflatable container comprising inner and outer flexible annular chambers having a common base, the inner chamber, including said common base, comprising at least one layer of cord fabric with the cords in the base arranged at a relatively small angle with reference to the longitudinal center line of the base to thereby permit substantial lateral stretch of the base upon inflation of the inner chamber and with the cords in the remainder of the inner chamber arranged at such an angle as to prevent any appreciable elongation of the outer periphery thereof.

2. An inflatable container comprising inner and outer flexible annular chambers having a common base, the inner chamber, including said common base, comprising at least one layer of cord fabric with the cords in the base arranged at a relatively small angle with reference to the longitudinal center line of the base to thereby permit substantial lateral stretch of the base upon inflation of the inner chamber and with the cords in the remainder of the inner chamber arranged at such an angle as to prevent any appreciable elongation of the outer periphery thereof, the cords in the base being separate from and overlapping cords in the adjacent portion of said tube and being bonded thereto.

3. An inflatable container comprising inner and outer flexible annular chambers having a common base, the inner chamber, including said common base, comprising at least two layers of cord fabric with the cords in the base arranged at a relatively small angle with reference to the longitudinal center line of the base with the cords of adjacent layers arranged at opposite angles with respect to said center line, to thereby permit substantial lateral stretch of the base upon inflation of the inner chamber and with the cords in the remainder of the inner chamber arranged at such an angle as to prevent any appreciable elongation of the outer periphery thereof.

4. An inflatable container comprising inner and outer flexible annular chambers having a common base, the inner chamber, including said common base, comprising at least two layers of cord fabric with the cords in the base arranged at a relatively small angle with reference to the longitudinal center line of the base with the cords of adjacent layers arranged at opposite angles with respect to said center line, to thereby permit substantial lateral stretch of the base upon inflation of the inner chamber and with the cords in the remainder of the inner chamber arranged at such an angle as to prevent any appreciable elongation of the outer periphery thereof, the cords in the base being separate from and overlapping cords in the adjacent portion of said tube and being bonded thereto.

5. An inflatable container as claimed in claim 3 in which there is a layer of rubber arranged between and bonded to the cords of adjacent layers of cord fabric in the base.

6. An inflatable container as claimed in claim 4 in which there is a layer of rubber arranged between and bonded to adjacent layers of cord fabric in the base.

7. An inflatable container comprising inner and outer flexible annular chambers having a common base, the inner chamber, including said common base, comprising at least one layer of cord fabric with the cords in the base arranged at not over an angle of 25° with reference to the longitudinal center line of the base, with the cords of adjacent layers arranged at opposite angles with respect to said center line to thereby permit substantial lateral stretch of the base upon inflation of the inner chamber, and with the cords in the remainder of the inner chamber arranged at such an angle as to prevent any appreciable elongation of the outer periphery thereof.

8. An inflatable container comprising inner and outer flexible annular chambers having a common base, the inner chamber, including said common base, comprising at least one layer of cord fabric with the cords in the base arranged at not over an angle of 25° with reference to the longitudinal center line of the base, with the cords of adjacent layers arranged at opposite angles with respect to said center line to thereby permit substantial lateral stretch of the base upon inflation of the inner chamber and with the cords in the remainder of the inner chamber arranged at such an angle as to prevent any appreciable elongation of the outer periphery thereof, the cords in the base being separate from and overlapping the cords in the adjacent portion of said tube and being bonded thereto.

9. An inflatable container comprising inner and outer flexible annular chambers having a common base, the inner chamber, comprising at least one layer of cord fabric in the base with the cords in the base arranged at a relatively small angle with reference to the longitudinal center line of the base to thereby permit substantial lateral stretch of the base upon inflation of the inner chamber, and the remainder of the inner chamber being constructed to prevent any appreciable elongation of the outer periphery thereof under the action of centrifugal force.

10. An inflatable container comprising inner and outer flexible annular chambers having a common base, the inner chamber, including said common base, comprising at least one layer of cord fabric in the base with the cords in the base arranged at a relatively small angle with reference to the longitudinal center line of the base to thereby permit substantial lateral stretch of the base upon inflation of the inner chamber, and the remainder of the inner chamber being formed of cord fabric arranged at such an angle as to prevent any appreciable elongation of the outer periphery thereof under the action of centrifugal force, the cords in the base being separate from and overlapping cords in the adjacent portion of said tube and being bonded thereto.

11. A device as set forth in claim 10 in which the cords in said base are arranged at an angle substantially not over 25° with respect to the longitudinal center line of said base and in which the cords in the remainder of the inner tube are arranged at an angle of approximately 60° with respect to the longitudinal center line of the outer periphery.

CHARLES H. ZIMMERMAN.